July 14, 1931.                J. R. ARMSTRONG                1,814,657
                    DEMAND LIMIT DEVICE FOR FLUID METERS
                           Filed April 17, 1923
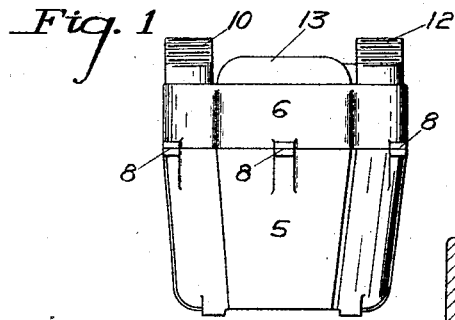
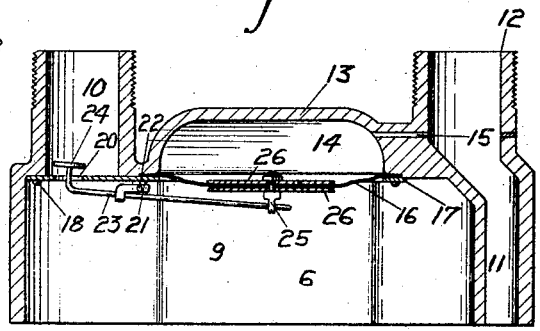
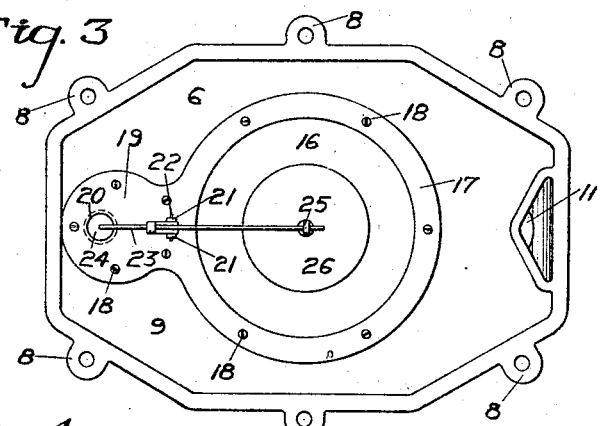
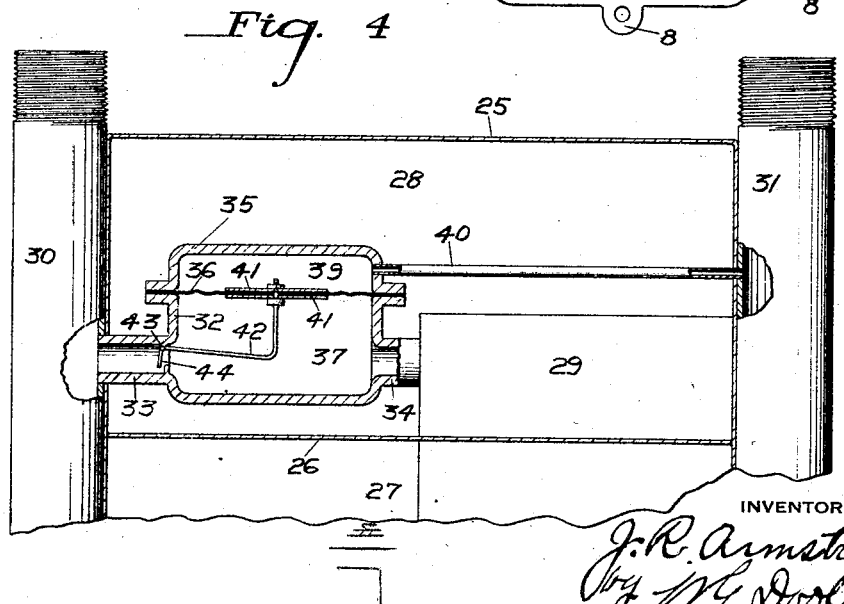
INVENTOR Patented July 14, 1931

1,814,657

UNITED STATES PATENT OFFICE

JAMES R. ARMSTRONG, OF INGRAM, PENNSYLVANIA, ASSIGNOR, BY MESNE ASSIGNMENTS, TO PITTSBURGH EQUITABLE METER COMPANY, OF PITTSBURGH, PENNSYLVANIA, A CORPORATION OF PENNSYLVANIA

DEMAND LIMIT DEVICE FOR FLUID METERS

Application filed April 17, 1923. Serial No. 632,642.

This invention is for a device for limiting the flow of gas or other fluid through a meter in accordance with a predetermined maximum.

Because it is necessary for gas companies to maintain a plant capable of meeting the maximum demand of the community which it serves, gas companies frequently charge each consumer a fixed amount each month, based on the maximum demand of that consumer. For instance, the consumer whose maximum demand, we may assume, is fifty cubic feet an hour, pays a smaller fixed amount monthly, than the consumer whose maximum requirement may be a hundred cubic feet per hour.

The present invention has for its principal object to provide a valve responsive to the difference in pressure between the incoming and outgoing sides of the meter, which will limit the flow of gas through the meter in accordance with the predetermined maximum demand, that is, a valve which will positively control the supply of gas to the customer so as to prevent him from using more gas than the maximum demand rate entitles him to.

A further object is to provide a device directly applicable to and contained in the usual type of meter. Other devices for effecting the same result have heretofore been installed outside of the meter.

The invention may be readily understood by reference to the accompanying drawings, in which:

Fig. 1 indicates a side elevation of a meter of a common type, to which my invention is most readily applicable;

Fig. 2 is a vertical section through the cover of the meter shown in Fig. 1;

Fig. 3 is a bottom plan view of the cover shown in Fig. 2;

Fig. 4 is a somewhat diagrammatic view, showing the invention applied to the so-called "box" or "tin" meter.

In the drawings, 5 designates a cast metal meter casing having a cast metal cover 6, the casing and cover having registering lugs 8 through which bolts may pass to removably secure the cover on the casing.

The cover is hollow inside, forming a chamber 9, into which the gas coming from the intake pipe connection 10 flows. From the chamber 9, it flows through the metering mechanism, which is of any known or preferred construction, and passes out the passage 11 formed in the end of the cover and separate from the chamber 9. Passage 11 opens into the outlet pipe connection 12.

Formed at the top of the cover is a dome 13, providing a secondary chamber 14. The chamber 14 communicates with the outlet passage or connection through the small passage 15, shown clearly in Fig. 2.

Separating chambers 9 and 14 is a diaphragm 16 of any suitable material, such as oiled sheep skin. The diaphragm is held sealed against the top of the cover by a metal plate or ring 17 screwed to the cover by bolts or screws 18. This ring serves to clamp the diaphragm in place. The ring has an offset extension 19, in which is a port or aperture 20. Portion 19 extends over the inlet entrance of the cover, so that all gas flowing into the meter must pass through the port 20.

On the ring or plate 17 are lugs 21, through which a pivot 22 of lever 23 passes. One arm of the lever passes through port 20 and carries a valve member 24. The other end of the lever connects with a stud 25 on a metal disk 26, which is clamped to the central part of the diaphragm, and which provides a weight to hold the diaphragm in its lowermost position, which is the normal position and which is the position in which valve 24 is open.

It is well known that the pressure of a fluid, such as gas, flowing through a meter, is lowered through the resistance it encounters in passing through the meter and actuating the metering mechanism. Consequently, the pressure in chamber 9 is, when gas is flowing through the meter, slightly greater than the pressure in passage 11, and consequently in chamber 14 which communicates with passage 11.

The diaphragm being weighted, is normally not affected by this difference in pressure. The more rapidly the gas is used or withdrawn from the outlet side, however, the greater is the differential pressure on the two sides of the diaphragm. Therefore, when the pressure in chamber 9 exceeds the pressure in chamber 14 sufficiently to overcome the weight of the parts attached to the diaphragm, the diaphragm will be forced upward, rocking lever 23 to draw valve 24 down over port 20, and thus stop the flow of gas.

In practice, the diaphragm will be weighted so as to allow for a predetermined maximum flow of gas through the meter before it will close. For instance, if the customer, or consumer, contracts for a maximum of fifty cubic feet per hour, the diaphragm has a certain predetermined weight attached to it, so that, as long as the consumer uses no more than the maximum of fifty cubic feet, the valve 24 will be kept in open position. When the maximum is exceeded, the difference in pressures will be such as to overcome this weight, and the valve will be closed. Then, as soon as the pressure in the meter equalizes, the weight of the diaphragm will cause it to drop and open the valve.

The device as described is extremely simple, and can be installed with very little modification of the meter structure, the entire device being carried in the cover. Proper weighting of the diaphragm for meeting the different maximum requirements of different customers may be easily calculated and effected.

The device may also be built into the "box" or "tin" type of meter, but with slightly more difficulty. Fig. 4 shows the invention applied to this type of meter. The meter box is designated 25, and 26 is the gallery plate which separates the bellows chamber 27 from the upper chamber 28. The valve chamber, within the upper chamber, is designated 29. In this figure, I have not shown the various shafts and cranks which are located in the upper chamber, as this mechanism is well known and understood, and forms no part of this invention. The intake pipe connection is designated 30, and 31 is the outlet pipe connection.

Ordinarily, a straight horizontal passage connects pipe 30 and valve chamber 29. In place of this passage, however, I put a casing 32 having a pipe 33 leading to pipe 30 and a pipe 34 leading to the valve chamber. The casing 32 has a removable cover 35, and clamped between the cover and the casing is diaphragm 36, dividing the interior of the casing into lower chamber 37 and an upper chamber 39. Pipe 40 connects upper chamber 39 with outlet pipe 31, so that the upper side of the diaphragm is subject to the outlet pressure and the lower side normally to inlet pressure.

Attached to the diaphragm are disks 41 which weight it and to the disks is attached a lever 42 pivoted at 43, the lever operating a valve 44. When the diaphragm moves up, the valve is closed and the incoming gas is shut off.

Various detail changes may be made in the construction and arrangement of parts within the contemplation of my invention and under the scope of the appended claims.

I claim as my invention:

1. The combination with a fluid meter for measuring the quantity of fluid passing therethrough, of means contained within the meter and associated therewith for restricting the rate of flow of fluid through the meter to a predetermined maximum, said means including an enclosed diaphragm having one side subject to pressure on the incoming side of the meter and one side subject to pressure on the outgoing side, said diaphragm being responsive to the difference in pressure, a valve, and means operatively connecting the valve and the diaphragm whereby when the differential pressure exceeds a predetermined maximum the valve will be closed.

2. The combination with a fluid meter having a housing, a pressure responsive diaphragm supported within the housing and dividing the interior of the housing into two chambers, an inlet connection in the housing opening into one chamber, an outlet connection in the housing and communicating with the other chamber whereby the diaphragm is subject to the differential between the pressure on the inlet and the pressure on the outlet sides of the meter, a valve for restricting the flow of fluid through the meter, and a connection for transmitting motion from the diaphragm to the valve, said connection being arranged to move the valve toward a closed position with a reduction of pressure on the outlet side of the meter.

3. A meter having a housing including a body and a cover, said cover having a hollow interior, a pressure responsive diaphragm extending across the hollow inside of the cover to separate the interior of the cover into two compartments one of which opens into the interior of the body, thereby forming separate chambers within the housing, an incoming connection on the cover opening into the chamber communicating with the body of the housing, an outlet connection on the cover, said outlet connection communicating with the chamber in the hollow interior of the cover only whereby the diaphragm is subject to the differential in pressure between the incoming and outgoing fluid, a valve in the incoming fluid connection, and an operating connection between the diaphragm and valve and serving to transmit closing movement of the valve with a predetermined decrease in pressure on the outlet side of the meter.

4. A fluid meter designed to supply fluid only so long as the rate of flow remains below a predetermined maximum, comprising a casing, a fluid inlet connection to said casing and a fluid outlet connection from said casing, a diaphragm within said casing, means affording communications so that one side of said diaphragm is subject to the pressure of the fluid entering said casing and so that the other side of said diaphragm is subject to the pressure in the outlet connection from said casing, a valve to control the flow of fluid through said inlet and means to connect said valve and said diaphragm whereby the position of said valve is controlled by the differential pressure existing between the fluid entering said casing and the fluid in said outlet connection.

In testimony whereof I affix my signature.

JAMES R. ARMSTRONG.